(12) United States Patent
Yajima et al.

(10) Patent No.: US 6,474,871 B2
(45) Date of Patent: Nov. 5, 2002

(54) ANTI-FRICTION BEARING AND A MOTOR INCLUDING SUCH A BEARING

(75) Inventors: Hiroyuki Yajima, Nagano-ken (JP); Hideki Matsuoka, Nagano-ken (JP)

(73) Assignee: Minebea Kabushiki-Kaisha, Nagano-ken (JP)

( * ) Notice: Subject to any disclaimer, the term of this patent is extended or adjusted under 35 U.S.C. 154(b) by 0 days.

(21) Appl. No.: 09/996,168

(22) Filed: Nov. 28, 2001

(65) Prior Publication Data
US 2002/0057857 A1 May 16, 2002

Related U.S. Application Data

(62) Division of application No. 09/413,229, filed on Oct. 6, 1999.

(30) Foreign Application Priority Data
Oct. 7, 1998 (JP) .............................................. 10-285742

(51) Int. Cl.$^7$ .......................... F16C 33/58; F16C 33/32
(52) U.S. Cl. ....................... 384/490; 384/450; 384/513; 384/516; 384/504
(58) Field of Search ................................. 384/450, 492, 384/504, 513, 516

(56) References Cited

U.S. PATENT DOCUMENTS

| | | | | |
|---|---|---|---|---|
| 4,713,704 A | * | 12/1987 | Voll et al. | ................. 360/97.02 |
| 5,782,563 A | | 7/1998 | Muto et al. | |

FOREIGN PATENT DOCUMENTS

| | | |
|---|---|---|
| JP | 8-247153 | 9/1996 |
| JP | 8-2471513 | 9/1996 |

* cited by examiner

Primary Examiner—William C Joyce
(74) Attorney, Agent, or Firm—Frishauf, Holtz, Goodman & Chick, P.C.

(57) ABSTRACT

An anti-frictional bearing which is reduced in its asynchronous rotational run out so that the cumbersome analyzing operation of the raceway surface and selecting operation of inner and/or outer races are not required. The bearing will contribute for the high packaging density and high speed operation of the hard disk device. An anti-frictional bearing including an inner raceway is formed on an outer peripheral surface of an inner race 1, an outer raceway 2a formed on an inner peripheral surface of an outer race 2, and a plurality of rotating bodies 3 interposed between the raceways and retained by retainers 4 in a predetermined distance with each other, wherein an out of roundness of a raceway surface 1a, 2a of at least one of said inner and outer races 1, 2 is equal to or less than 0.05 μm.

1 Claim, 18 Drawing Sheets

FIG. 6

|    | N+0   | N+1   | N+2   | N+3   | N+4   | N+5   | N+6   |
|----|-------|-------|-------|-------|-------|-------|-------|
| 0  |       | ------| 0.014 | 0.004 | 0.004 | 0.001 | ------|
| 7  | 0.001 | ------| ------| ------| ------| 0.001 | ------|
| 14 | ------| ------| ------| ------| ------| ------| ------|
| 21 | ------| ------| ------| ------| ------| ------| ------|
| 20 | ------| ------| ------| ------| ------| ------| ------|
| 35 | ------| ------| ------| ------| ------| ------| ------|
| 42 | ------| ------| ------| ------| ------| ------| ------|
| 49 | ------| ------| ------| ------| ------| ------| ------|
| 56 | ------| ------| ------| ------| ------| ------| ------|
| 63 | ------| ------| ------| ------| ------| ------| ------|
| 70 | ------| ------| ------| ------| ------| ------| ------|
| 77 | ------| ------| ------| ------| ------| ------| ------|
| 84 | ------| ------| ------| ------| ------| ------| ------|

FIG. 7

|    | N+0   | N+1   | N+2   | N+3   | N+4   | N+5   | N+6   |
|----|-------|-------|-------|-------|-------|-------|-------|
| 0  |       | ------| 0.008 | 0.001 | 0.004 | 0.002 | 0.004 |
| 7  | 0.001 | 0.001 | 0.001 | 0.001 | ------| ------| ------|
| 14 | ------| ------| ------| ------| ------| ------| ------|
| 21 | ------| ------| ------| ------| ------| ------| ------|
| 20 | ------| ------| ------| ------| ------| ------| ------|
| 35 | ------| ------| ------| ------| ------| ------| ------|
| 42 | ------| ------| ------| ------| ------| ------| ------|
| 49 | ------| ------| ------| ------| ------| ------| ------|
| 56 | ------| ------| ------| ------| ------| ------| ------|
| 63 | ------| ------| ------| ------| ------| ------| ------|
| 70 | ------| ------| ------| ------| ------| ------| ------|
| 77 | ------| ------| ------| ------| ------| ------| ------|
| 84 | ------| ------| ------| ------| ------| ------| ------|

|    | N+0 | N+1 | N+2   | N+3   | N+4   | N+5   | N+6   |
|----|-----|-----|-------|-------|-------|-------|-------|
| 0  |     | ----- | 0.003 | 0.006 | 0.002 | 0.002 | 0.001 |
| 7  | ----- | ----- | ----- | ----- | ----- | ----- | ----- |
| 14 | ----- | ----- | ----- | ----- | ----- | ----- | ----- |
| 21 | ----- | ----- | ----- | ----- | ----- | ----- | ----- |
| 20 | ----- | ----- | ----- | ----- | ----- | ----- | ----- |
| 35 | ----- | ----- | ----- | ----- | ----- | ----- | ----- |
| 42 | ----- | ----- | ----- | ----- | ----- | ----- | ----- |
| 49 | ----- | ----- | ----- | ----- | ----- | ----- | ----- |
| 56 | ----- | ----- | ----- | ----- | ----- | ----- | ----- |
| 63 | ----- | ----- | ----- | ----- | ----- | ----- | ----- |
| 70 | ----- | ----- | ----- | ----- | ----- | ----- | ----- |
| 77 | ----- | ----- | ----- | ----- | ----- | ----- | ----- |
| 84 | ----- | ----- | ----- | ----- | ----- | ----- | ----- |

The result of the measurement of the NRRO component of outer race

The result of the measurement of the NRRO component of inner race (1)

The result of the measurement of the NRRO component of inner race (2)

FIG. 24
Prior Art

|    | N+0   | N+1   | N+2   | N+3   | N+4   | N+5   | N+6   |
|----|-------|-------|-------|-------|-------|-------|-------|
| 0  |       | ----- | 0.033 | 0.017 | 0.005 | 0.003 | 0.001 |
| 7  | 0.002 | 0.006 | 0.005 | 0.003 | 0.005 | ----- | 0.002 |
| 14 | 0.001 | 0.001 | 0.001 | ----- | 0.002 | 0.002 | 0.001 |
| 21 | ----- | 0.001 | 0.001 | ----- | ----- | 0.001 | ----- |
| 28 | ----- | ----- | ----- | 0.001 | 0.001 | 0.001 | 0.001 |
| 35 | ----- | ----- | ----- | ----- | ----- | ----- | ----- |
| 42 | ----- | ----- | ----- | ----- | ----- | ----- | ----- |
| 49 | ----- | ----- | ----- | ----- | ----- | ----- | ----- |
| 56 | ----- | ----- | ----- | ----- | ----- | ----- | ----- |
| 63 | ----- | ----- | ----- | ----- | ----- | ----- | ----- |
| 70 | ----- | ----- | ----- | ----- | ----- | ----- | ----- |
| 77 | ----- | ----- | ----- | ----- | ----- | ----- | ----- |
| 84 | ----- | ----- | ----- | ----- | ----- | ----- | ----- |

FIG. 25
Prior Art

|    | N+0   | N+1   | N+2   | N+3   | N+4   | N+5   | N+6   |
|----|-------|-------|-------|-------|-------|-------|-------|
| 0  |       | ----- | 0.032 | 0.006 | 0.006 | 0.002 | 0.003 |
| 7  | 0.001 | ----- | 0.003 | ----- | 0.002 | 0.001 | ----- |
| 14 | 0.001 | ----- | ----- | ----- | ----- | ----- | ----- |
| 21 | ----- | ----- | ----- | ----- | ----- | ----- | ----- |
| 28 | ----- | ----- | ----- | ----- | ----- | ----- | ----- |
| 35 | ----- | ----- | ----- | ----- | ----- | ----- | ----- |
| 42 | ----- | ----- | ----- | ----- | ----- | ----- | ----- |
| 49 | ----- | ----- | ----- | ----- | ----- | ----- | ----- |
| 56 | ----- | ----- | ----- | ----- | ----- | ----- | ----- |
| 63 | ----- | ----- | ----- | ----- | ----- | ----- | ----- |
| 70 | ----- | ----- | ----- | ----- | ----- | ----- | ----- |
| 77 | ----- | ----- | ----- | ----- | ----- | ----- | ----- |
| 84 | ----- | ----- | ----- | ----- | ----- | ----- | ----- |

FIG. 26
Prior Art

|   | N+0 | N+1 | N+2 | N+3 | N+4 | N+5 | N+6 |
|---|---|---|---|---|---|---|---|
| 0 |  | ----- | 0.021 | 0.007 | 0.005 | 0.005 | 0.004 |
| 7 | 0.003 | 0.003 | 0.003 | 0.004 | 0.001 | ----- | ----- |
| 14 | ----- | ----- | ----- | ----- | ----- | ----- | ----- |
| 21 | ----- | ----- | ----- | ----- | ----- | ----- | ----- |
| 28 | ----- | ----- | ----- | ----- | ----- | ----- | ----- |
| 35 | ----- | ----- | ----- | ----- | ----- | ----- | ----- |
| 42 | ----- | ----- | ----- | ----- | ----- | ----- | ----- |
| 49 | ----- | ----- | ----- | ----- | ----- | ----- | ----- |
| 56 | ----- | ----- | ----- | ----- | ----- | ----- | ----- |
| 63 | ----- | ----- | ----- | ----- | ----- | ----- | ----- |
| 70 | ----- | ----- | ----- | ----- | ----- | ----- | ----- |
| 77 | ----- | ----- | ----- | ----- | ----- | ----- | ----- |
| 84 | ----- | ----- | ----- | ----- | ----- | ----- | ----- |

FIG. 27
Prior Art

|   | N+0 | N+1 | N+2 | N+3 | N+4 | N+5 | N+6 |
|---|---|---|---|---|---|---|---|
| 0 |  | ----- | 0.009 | 0.002 | 0.002 | 0.006 | 0.006 |
| 7 | 0.004 | 0.004 | 0.003 | 0.004 | 0.003 | ----- | ----- |
| 14 | 0.001 | ----- | ----- | ----- | ----- | ----- | ----- |
| 21 | 0.001 | ----- | ----- | ----- | ----- | ----- | ----- |
| 28 | ----- | ----- | ----- | ----- | ----- | ----- | ----- |
| 35 | ----- | ----- | ----- | ----- | ----- | ----- | ----- |
| 42 | ----- | ----- | ----- | ----- | ----- | ----- | ----- |
| 49 | ----- | ----- | ----- | ----- | ----- | ----- | ----- |
| 56 | ----- | ----- | ----- | ----- | ----- | ----- | ----- |
| 63 | ----- | ----- | ----- | ----- | ----- | ----- | ----- |
| 70 | ----- | ----- | ----- | ----- | ----- | ----- | ----- |
| 77 | ----- | ----- | ----- | ----- | ----- | ----- | ----- |
| 84 | ----- | ----- | ----- | ----- | ----- | ----- | ----- |

ANTI-FRICTION BEARING AND A MOTOR INCLUDING SUCH A BEARING

CROSS-REFERENCE TO RELATED APPLICATION

This is a divisional of application Ser. No. 09/413,229 filed on Oct. 6, 1999 (allowed), the entire disclosure of which is incorporated hereby reference.

BACKGROUND OF THE INVENTION

1. Technical Field

The present invention relates to an anti-frictional bearing constituting a rotationally supporting portion of a spindle motor of a hard disk drive device, VTR, and so on. The present invention further relates to a motor into which such a bearing is incorporated.

2. Description of the Prior Art

The compact hard disk device to be incorporated into a personal computer includes magnetic disk or disks driven by means of spindle motor in high rotational speed. The rotational member of such motor is adapted to be journalled through an anti-friction bearing having an inner diameter of 4–6 mm and an outer diameter of 8–15 mm.

Recently, a remarkable development or improvement is achieved in the hard disk device regarding the miniaturization and high packaging density. Especially for the hard disk device the size of which is equal to or less than 3.5 inch, the packaging density is increased rapidly. More recently, the hard disk device of the size of 2.5 inch to be incorporated into the hand held personal computer of the note book type is also demanded to have substantially the same memory capacity as that of the hard disk device of 3.5 inch in spite of its small size.

In order to enlarge the memory capacity of the hard disk device of the size of 2.5 inch, it is necessary to increase both of the track recording density and the track density. The presently demanded track density from 10 KTPI to 14 KTPI (TPI: Track Per Inch) can be satisfied by the track pitch less than 2.54 μm. This value of the track pitch corresponds with the track density of 10 KTPI.

In either hard disk device tge size if which is 3.5 inch or 2.5 inch, it is necessary to increase the number of revolutions of the magnetic disk or disk to increase the data transfer rate of the hard disk device. For example, the hard disk device of 3.5 inch requires the number of revolution from 5400 rpm to 7200 rpm, and the hard disk device of 2.5 inch requires the number of revlution from 4000 rpm to 5000 rpm.

When it is intended to read or write datum accurately into the magnetic disk of increased track density, it is necessary to reduce the rotational run out of the magnetic disk. The rotational run out is apt to increase in proportion to the number of revolutions of the magnetic disk. It is therefore important in the high packaging density of the hard disk device to improve the precision of the rotational run out of the magnetic disk. It is therefore important in the high packaging density of the hard disk device to improve the precision of the rotational run out of the magnetic disk.

In order to reduce the rotational run out of the magnetic disk, it is necessary to reduce the run out attributable to the anti-frictional bearing itself of the spindle motor for driving the magnetic disk. The counter measures having been taken for the problem of the rotational run out of the magnetic disk are to improve the sphericity of the rotational bodies of the anti-frictional bearing and to effect the high precision working on the raceway surface of the inner and/or outer races to reduce the working tolerance to the minimum.

However, a microscopic undulation formed inevitably during working or processing on the raceway surface of the inner and/or outer race will change the relative position of the inner and outer races during the operation of the bearing. This changing of the relative position will cause the rotational run out. This rotational run out can be observed as an irregular run out in which the positional relationship between the inner race and the outer race is asynchronous with the rotation of the bearing. This run out is known as an asynchronous rotational run out referred to as NRRO (non-repeatable run out).

When the asynchronous rotational run out is increased beyond the allowable maximum extent, the magnetic head for reading and/or writing date can not be moved accurately relative to the magnetic disk of high tracking density. This will cause an error in effecting the reading and/or writing datum into disk. In conclusion, the asynchronous rotational run out will fail the reliability of the hard disk device.

In other words, the asynchronous rotational run out of the anti-frictional bearing to be incorporated into the spindle motor will interfere the high packaging density and the high speed of the hard disk device, i.e. the reduction of the asynchronous rotational run out of the anti-frictional bearing to be incorporated into the spindle motor is extraordinarily important in achieving the high packaging density and the high speed of the hard disk device.

The asynchronous rotational run out is influenced by the shape of the undulation on the raceway surface of the inner and/or outer races and the number of rotational bodies interposed therebetween. In order to reduce the asynchronous rotational run out, it is necessary to measure the out of roundness of the raceway surface accurately, to wake a harmonic analysis on thus obtained value of measurement as described below, and to select the inner and/or outer races which are suitable for the number of rotating bodies to be interposed therebetween. The harmonic analysis will now be described as follows.

Each of the inner and/or outer races has a raceway surface representing a complex undulation. This undulation can be seized as a function, the frequency of which is one revolution, i.e. the function is a composite of a plurality of harmonic vibrations.

In concretely, the shape of raceway surface as shown in FIG. 19(*a*) can be seized as a composite of a harmonic vibration of the frequency of ⅓ revolution (tertiary vibration) as shown in FIG. 19(*b*), a harmonic vibration of the frequency of ⅐ revolution (seventh vibration) as shown in FIG. 19(*c*), and a harmonic vibration of the frequency of 1/50 revolution (fifty vibration) as shown in FIG. 19(*d*).

In this connection, the undulation presented on the raceway surface can be expressed as a following function f(t) including a plurality of frequencies ω, 2ω, 3ω . . .

$$f(t)=C_0+C_1 \cos(\omega t+\phi_1)+C_2 \cos(2\omega t+\phi_2)+C_3 \cos(3\omega t+\phi_3)+\ldots$$

In the harmonic analysis, the constant $C_0, C_1, C_2, \ldots, \phi_1, \phi_2, \ldots$ are determined.

In the harmonic analysis effected on the shape of the raceway surface of the inner and/or outer races, the harmonic vibration of 1/n revolution forms a shape of an undulation including crests the number of which is n. In this connection, the harmonic vibration of 1/n revolution is referred to as the undulation including crests the number of which is n. The medial magnitude ($C_1, C_2, \ldots$) of the displacement amplitude of the shape varying in a sinusoidal manner is referred to as unilateral amplitude of each number of crests.

The shape of the raceway surface of each inner raceway, the out of roundness of which are 0.13 μm, 0.096 μm, 0.084 μm, and 0.055 μm is shown in FIGS. 20–23 respectively in the magnification of 100,000. The results of the harmonic analysis made on each shape of the raceway surface are shown in FIGS. 24–27 respectively.

The numbers put on the left column of each table are basic number N, the numbers to be added to the basic number N are put on the upper row of each table, and the values listed on the table are the values of unilateral amplitude.

For example, in the table of FIG. 24, the value put on the field of N+0 of the second row (N=7) leans that the component of vibration of 1/7 revolution of the shape of the raceway surface as shown in FIG. 20 is 0.002 μm, that is the unilateral amplitude in the case that the number of crests are seven is also 0.002 μm. The value put on the field of N+1 of the second row means that the unilateral amplitude in the case that the number of crests are eight is 0.006 μm, and the value put on the field of N+2 of the second row means that the unilateral amplitude in the case that the number of crests are eight is 0.005 μm. The designation --- put on the fields of the table means that the unilateral amplitude can not be measured, i.e. there are substantially no unilateral amplitude.

The asynchronous rotational run out of the anti-frictional bearing relates to the shape of the undulation represented on the raceway surfaces of the inner and/or outer race and the number of rotating bodies as mentioned above. Particularly, it is known that the value of unilateral amplitude in the number of crests of aZ and aZ±1 (a is positive integer, and Z is the number of rotating bodies) will influence on the rotational run out.

This is caused by the run out due to the deflection between the rotating bodies and the positions of the crests. In this connection, when the anti-frictional bearing, including rotating bodies the number of which is Z, is intended to be manufactured, the inner or outer races greater in its value of unilateral amplitude can not be employed, since they will cause the rotational run out of the anti-frictional bearing.

Concretely, the number of rotating bodies to be utilized for the anti-frictional bearing of the spindle motor of the hard disk device of the size equal to or smaller than 3.5 inch is normally from 8 to 12. Explaining on the most general case that the number of rotating bodies is eight, the values of the unilateral amplitude put on each field of N+0 (the number of crest is seven), N+1 (the number of crest is eight), and N+2 (the number of crest is nine) of the second row of each of FIGS. 24–27 will influence on the rotational run out, so that it is necessary to reduce these values to 0.002 μm or less than 0.002 μm.

However, in each table of FIGS. 24–27, the values of the unilateral amplitude on the number of crests from seven to nine does not satisfy the above mentioned condition, so that the inner race representing the shape of the raceway surface as illustrated in FIGS. 20–23 are unsuitable for using in the anti-frictional bearing including eight rotating bodies.

As mentioned above, it is necessary in the prior art to make following cumbersome operations to obtain the anti-frictional bearing reduced in its asynchronous rotational run out and thus suitable for the spindle motor of the hard disk device. The above-mentioned operations are to make a measurement on the out of roundness of the inner and/or outer races, to make the harmonic analysis thereon, and to select the inner and/or outer races based on the relationship between the unilateral amplitude obtained by the harmonic analysis and the nailer of crests.

Accordingly the object of the present invention is to solve the problems of the prior art. In other words, the object of the present invention is to provide an anti-frictional bearing in which the asynchronous rotational run out is reduced substantially, the complex analyzing operation and the selecting operation to be carried on the inner and/or outer races are unnecessary, and high packaging density and high speed of the hard disk device can be assured when it is incorporated into the spindle motor of the hard disk device. Another object of the present invention is to provide a motor including such anti-frictional bearing.

SUMMARY OF THE INVENTION

These and other objects are achieved by an anti-frictional bearing including an inner raceway formed on an outer peripheral surface of an inner race, an outer raceway formed on an outer peripheral surface of an inner race, an outer raceway formed on an inner race peripheral surface of an outer race, and a plurality of rotating bodies interposed between the race ways and retained by retainers in a predetermined distance with each other, wherein an out of roundness of a raceway surface of at least one of said inner and outer race is equal to 0.05 μm or less than 0.05 μm.

BRIEF DESCRIPTION OF THE DRAWINGS

Further feature of the present invention will become apparent to those skilled in the art to which the present invention relates from reading the following specification with reference to the accompanying drawings, in which:

FIG. 6 is a table representing the result of the harmonic analysis effected on the race way of the anti-frictional bearing as shown in FIG. 3;

FIG. 7 is a table representing the result of the harmonic analysis effected on the inner raceway of the anti-frictional bearing as shown in FIG. 4;

Fig. 24 is a table representing the result of the harmonic analysis effective on the inner raceway of the anti-frictional bearing of prior art as shown in FIG. 20;

FIG. 25 is a table representing the result of the harmonic analysis effected on the inner raceway of the anti-frictional bearing of prior art as shown in FIG. 21;

FIG. 26 is a table representing the result of the harmonic analysis effected on the inner raceway of the anti-frictional bearing of prior art as shown in FIG. 22; and FIG. 27 is a table representing the result of the harmonic analysis effected on the inner raceway of the anti-frictional bearing of prior art as shown in FIG. 23.

DETAILED DESCRIPTION OF THE PRESENT INVENTION

The anti-frictional bearing of the present invention will now be described with reference to the attached drawings.

Figure 1:
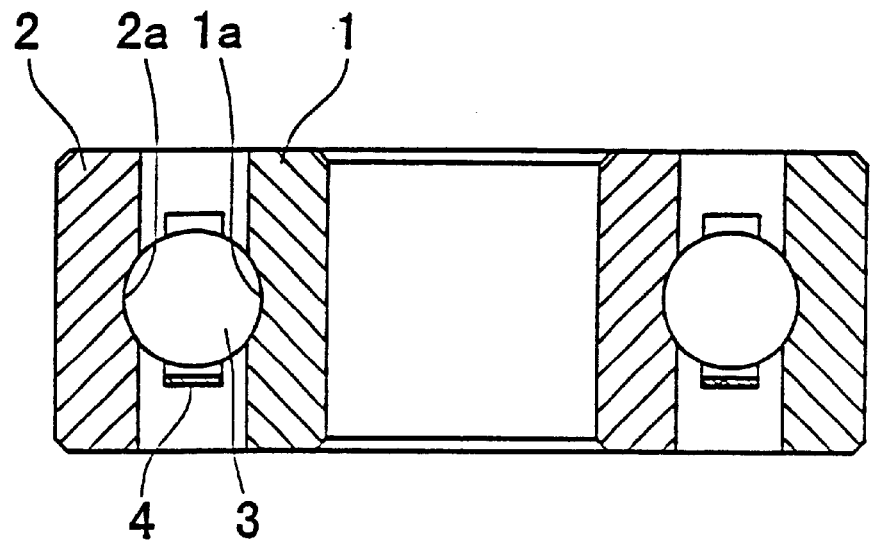
FIG. 1 is a vertical cross sectional view showing the anti-frictional bearing to which the present invention will be applied.
Figure 2:
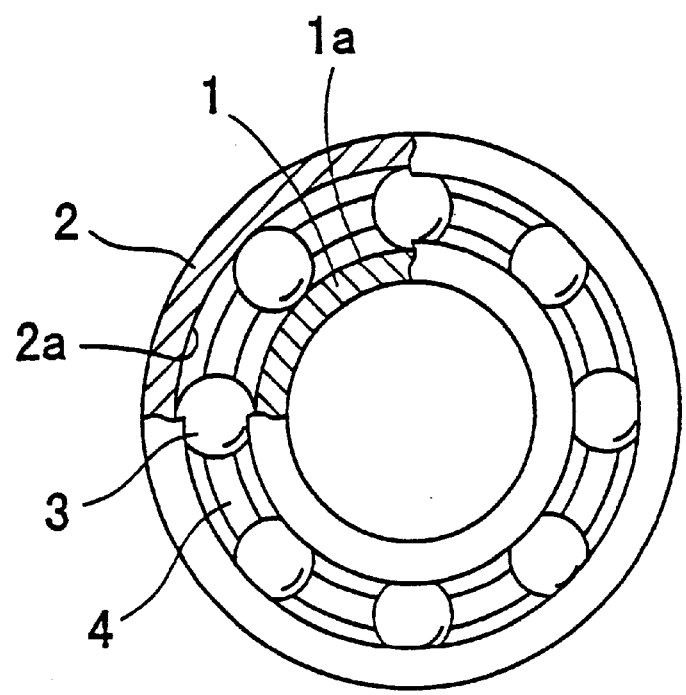
FIG. 2 is a partially sectional plan view of the anti-frictional bearing of FIG. 1.

The anti-frictional bearing which is the subject of the present invention is shown in FIGS. 1 and 2. The ball as 3 as rotating bodies of the bearings are interposed between the inner raceway 1a provided on the outer peripheral surface of the inner race 1 and the outer raceway 2a provided on the inner peripheral surface of the outer race 2. The balls 3 are equidistantly retained around the shaft by means of retainers 4.

Figure 3:
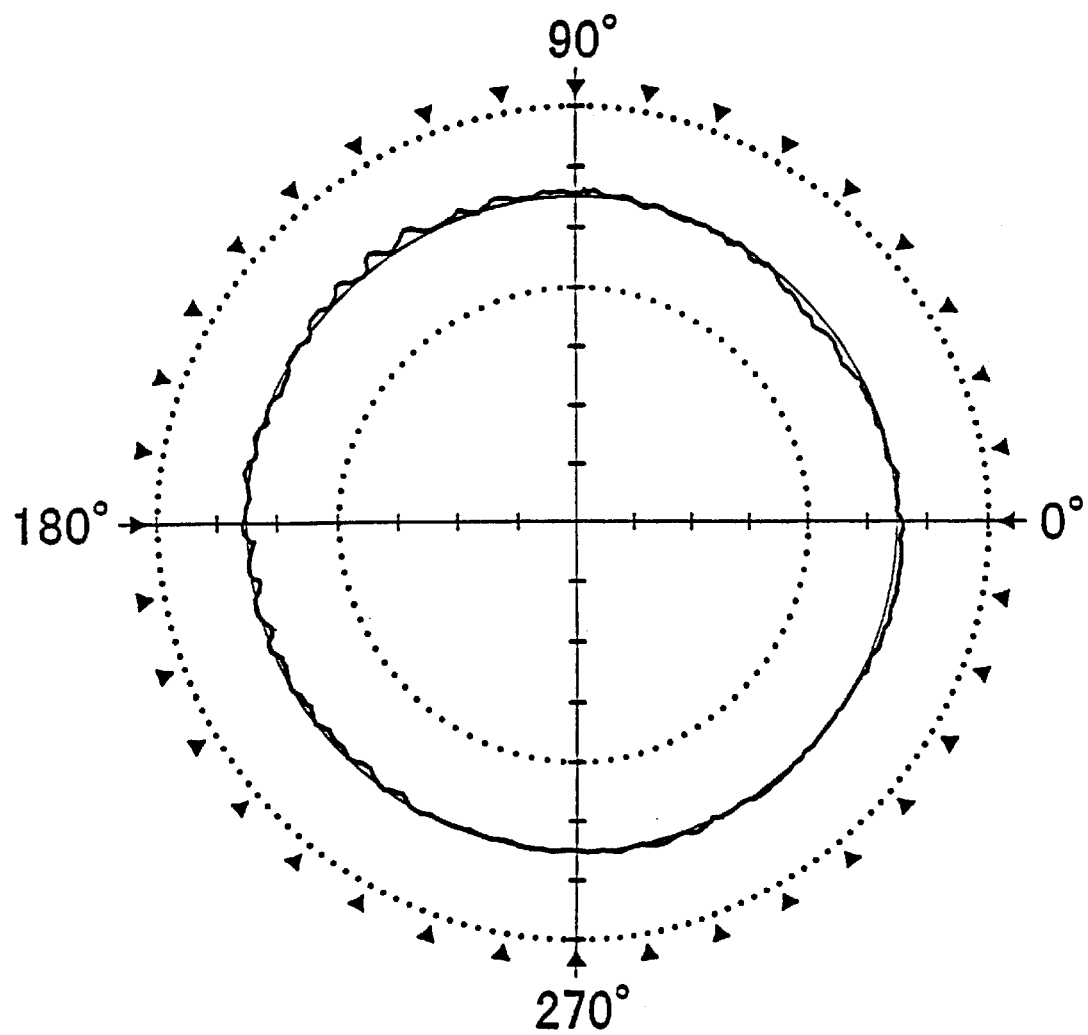
FIG. 3 is a schematic diagram of the shape of the undulation of the inner raceway of the anti-frictional bearing in accordance with the present invention.
Figure 4:
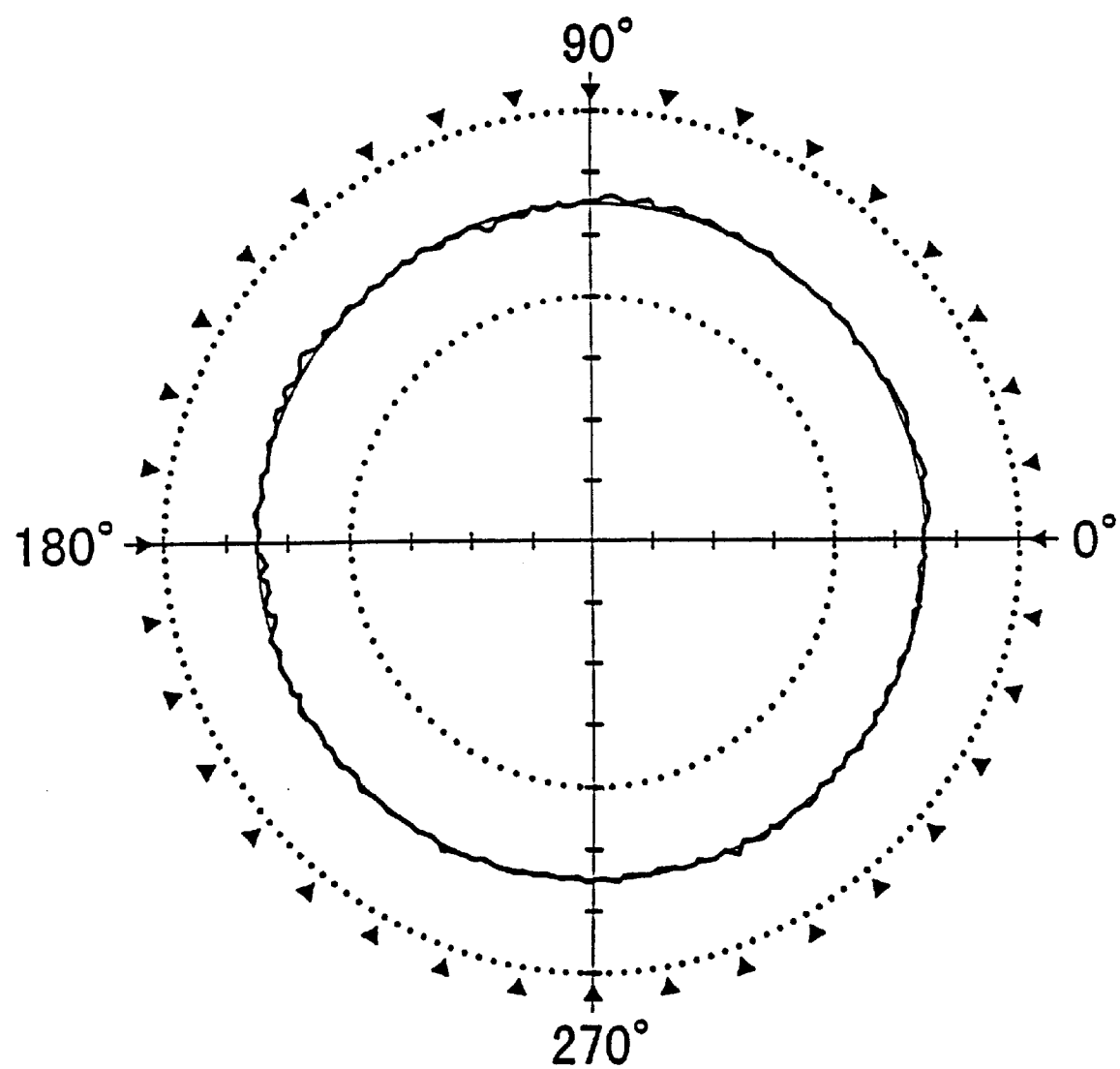
FIG. 4 is a schematic diagram of the shape of the undulation of the inner raceway of the other anti-frictional bearing in accordance with the present invention.
Figure 5:
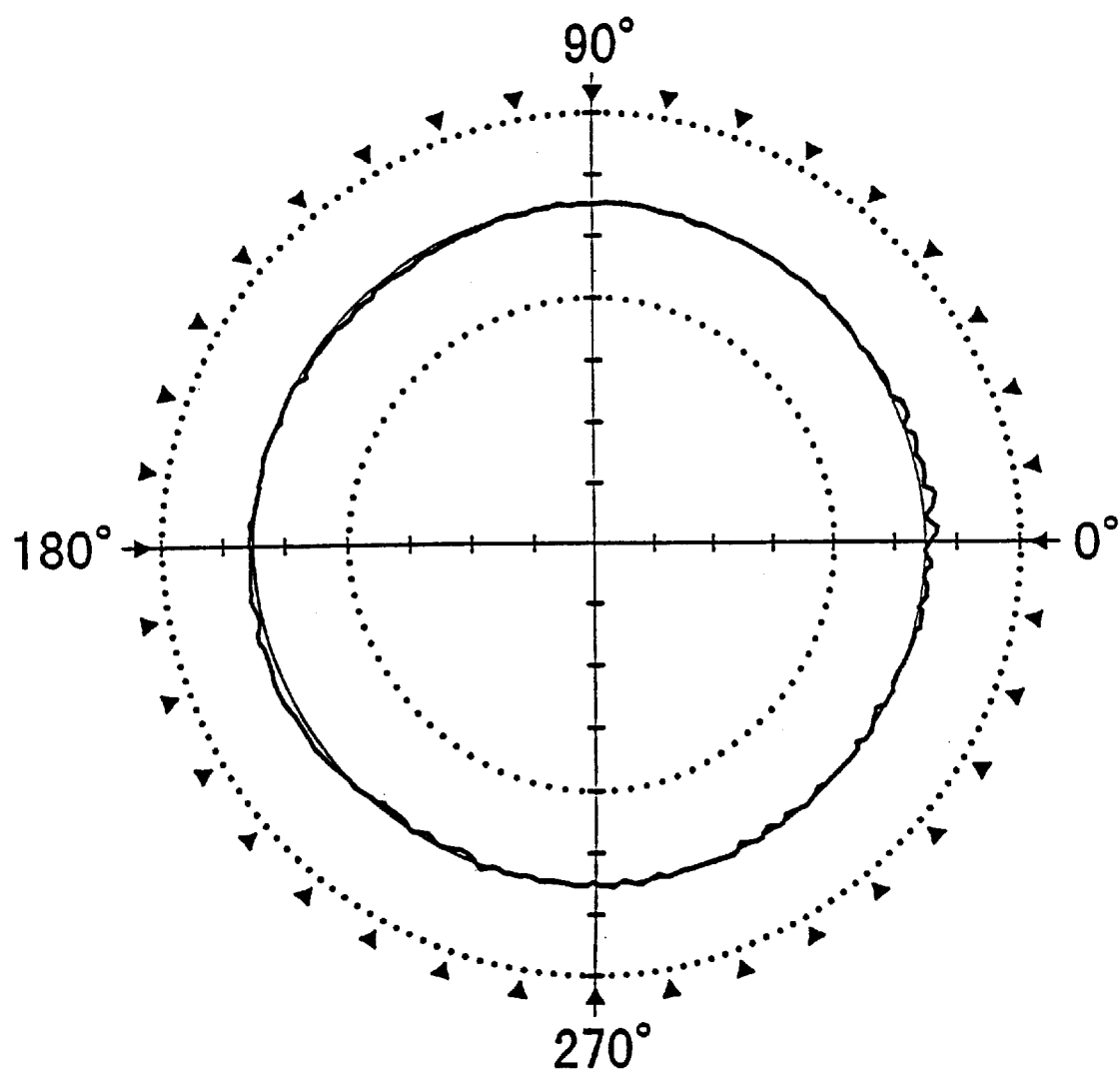
FIG. 5 is a schematic diagram of the shape of the undulation of the inner raceway of the further anti-frictional bearing in accordance with the present invention.

The shape of the undulation of the inner raceway 1a of the anti-frictinal bearing is shown in FIGS. 3, 4, and 5 respectively in the magnification of 100,000. This out of roundness of each shape shown in FIGS. 3, 4, and 5 is 0.048 μm, 0.037 μm, and 0.333 μm respectively. The number of crests and the unilateral magnitude of each inner raceway having such shape in its raceway surface derived from the harmonic analysis are listed in FIGS. 6, 7, and 8 respectively.

In each inner raceway shown in FIGS. 3, 4, and 5, the out of roundness is equal to or less than 0.05 μm, and the relationship between the number of crest and the unilateral amplitude in the number of crest equal to or above 7 (N+0) is equal to or less than 0.001 μm (N means a number of the rotating bodies included in the bearing) as shown in the table of 6, 7, and 8.

In other words, in the case that the out of roundness of the inner raceway is equal to or less than 0.05 μm, the unilateral amplitude in the number of crest above 7 are all equal to or less than 0.001 μm. In this connection, when the number of rotating bodies are either of the number from eight to twelve, the unilateral amplitude in the number of crest from 7 to 13 will be equal to or less than 0.001 μm. This means that the effect on the run out of the bearing will be reduced to a minimum.

In the case that the out of roundness of the inner raceway is equal to or less than 0.05 μm, it is unnecessary to analyze the unilateral amplitude in the number of crest included on the inner raceway to select the inner race to the number of rotating bodies, i.e. such inner race can be incorporated into the bearing irrespective of the number of the rotating bodies. In other words, it is only necessary to measure the out of roundness, and the harmonic analyzing operation can also be eliminated.

Figures 8, 9:
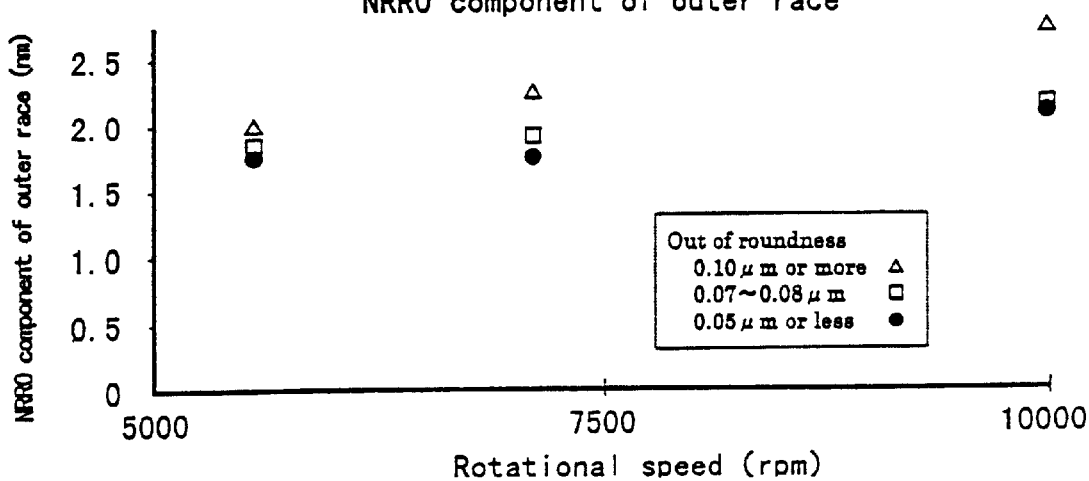
FIG. 8 is a table representing the result of the harmonic analysis effected on the inner raceway of the anti-frictional bearing as shown in FIG. 5.
FIGS. 9–11 are the graphs showing the results of the measurement on the value of the asynchronous rotational run out (NRRO) of the bearing into which the inner race of the present invention having the out of roundness of its inner raceway equal to or less than 0.05 μm is incorporated. Also shown in these figures as relatives are the results obtained in the measurement on the value of the asynchronous rotational run out of the bearing into which the inner race having the out of roundness of its inner raceway from 0.07 μm to 0.08 μm is incorporated, and results of the bearing into which the inner race having the out of roundness of its inner raceway more than 0.10 μm respectively is incorporated.
Figure 10:
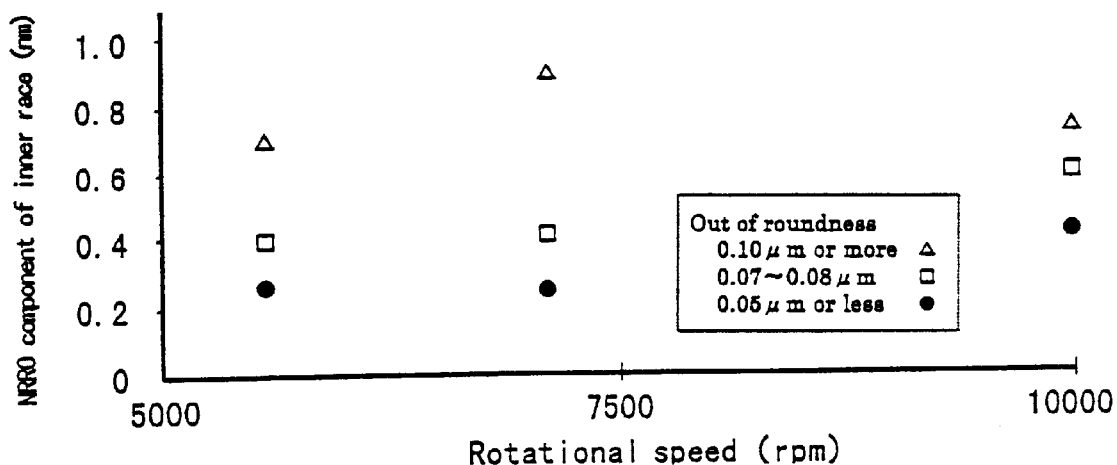
Figure 11:
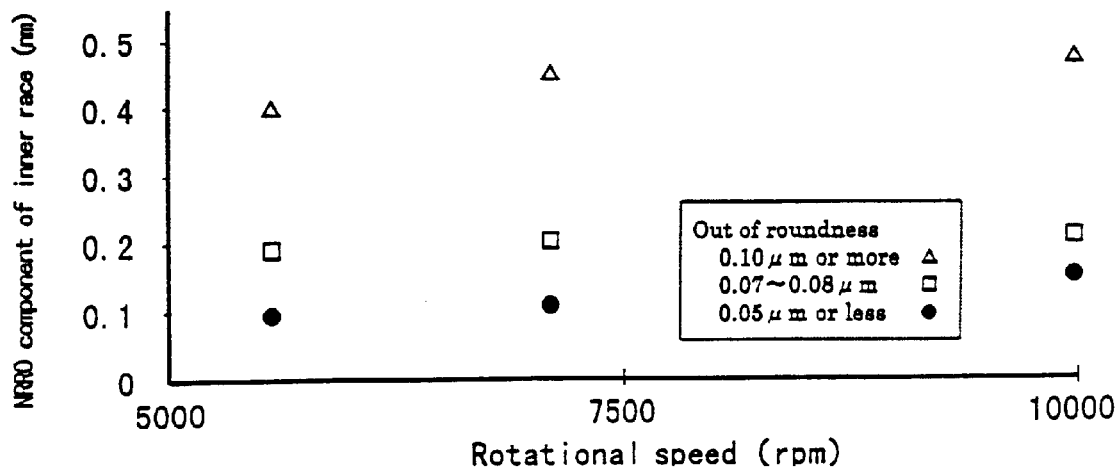

The graphs shown in FIGS. 9–11 are the results of the measurement on the value of the asynchronous rotational run out (NRRO) of the bearing into which the inner race of the present invention having the out of roundness of its inner raceway equal to or less than 0.05 μm is incorporated.

Also shown in these figures as relatives are the results obtained in the measurement on the value of the asynchronous rotational run out of the bearing into which the inner race having the out of roundness of its inner raceway from 0.07 μm to 0.08 μm is incorporated, and results of the bearing into which the inner race having the out of roundness of its inner raceway more than 0.10 μm respectively is incorporated.

As shown in these figures, it is evident that the one having the out of roundness equal to or less than 0.05 μm is reduced in its NRRO components of both outer and inner races.

Figure 12:
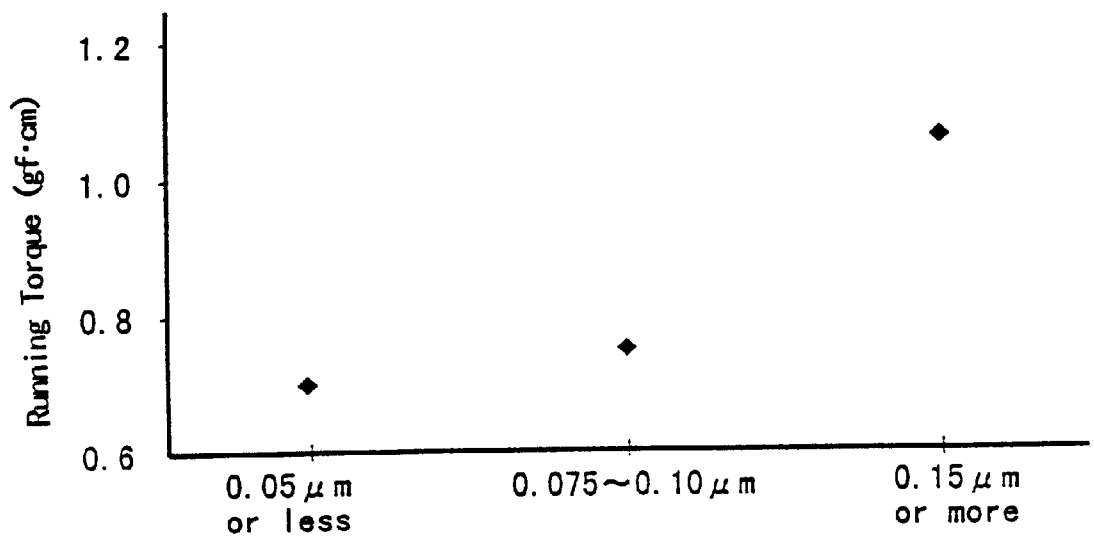
FIG. 12 is the graph showing the result obtained from the measurement test on the value of the rotational torque of the bearing of the present invention into which the inner race having the out of roundness of its inner raceway equal to or less than 0.05 μm is incorporated. Also measured in this test as relatives are the results obtained in the measurement on the value of the rotational torque of the bearing into which the inner race having the out of roundness of its inner raceway from 0.075 μm to 0.10 μm is incorporated, and that of the bearing into which the inner race having the out of roundness of its inner raceway than 0.15 μm respectively is incorporated.

FIG. 12 shows the results obtained from the measurement test on the value of the rotational torque of the bearing of the present invention into which the inner race having the out of roundness of its inner raceway equal to or less than 0.05 μm.

Also measured in this test as relatives are the results obtained in the measurement on the value of the rotational torque of the bearing into which the inner race having the out of roundness of its inner raceway from 0.075 μm to 0.10 μm is incorporated, and that of the bearing into which the inner race having the out of roundness of its inner raceway more than 0.15 μm respectively is incorporated.

This measurement test is effected by employing the ball bearing having following features:

| | |
|---|---|
| Outer diameter; | 15 mm |
| Inner diameter; | 5 mm |
| Number of balls; | 8 pcs |
| Rotational speed; | 2 rpm |
| Pre-load; | 350 gf |

The bearing is of oil lubricating outer race rotating type.

The reduction of the rotational run out equal to or less than 0.05 μm will also reduce the frictional torque of the anti-frictional bearing.

Further, it can be ensured that the anti-frictional bearing of the present invention is also reduced in its value of andelon, and that the required drive power can also be reduced, when using such bearing in the spindle motor.

Although in the above-mentioned embodiment, the relationship between the out of roundness and the unilateral amplitude of the inner race is explained, this relationship can also be obtained in the case of the outer race. If it is intended to reduce further the asynchronous rotational run out, it is desirable to make the out of run out of both of the inner and outer races equal to or less than 0.05 μm.

Although the ball bearing using balls as rotating bodies is described, the present invention can also be applied equally to the other anti-frictional bearing such as roller bearings.

Figure 13:
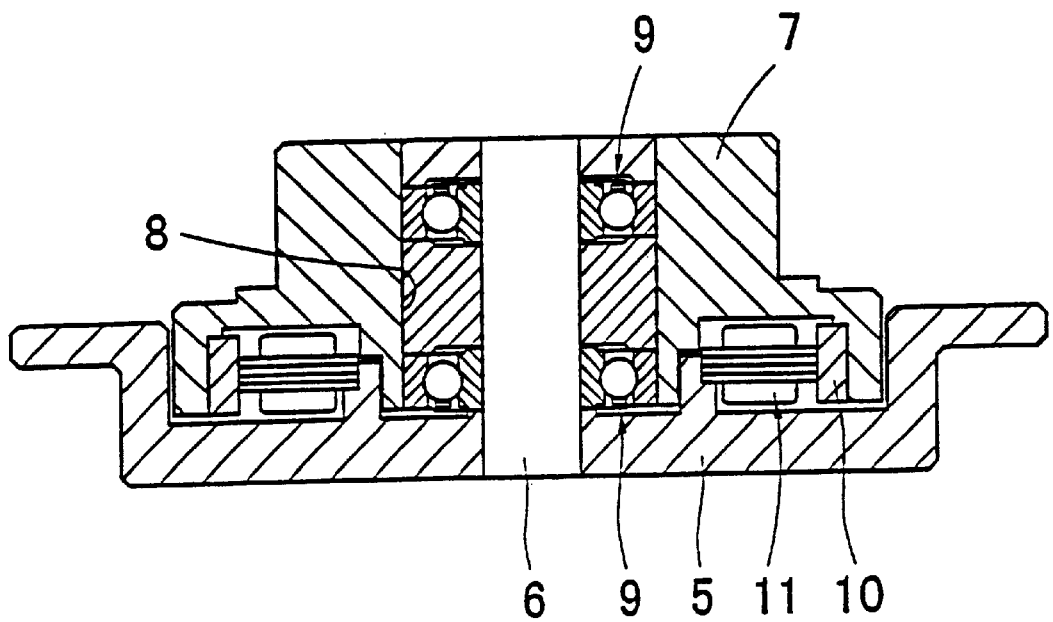
FIG. 13 is a vertical cross sectional view showing an example of the motor in accordance with the present invention.

The anti-frictional bearing having an arrangement as described above is adapted to be used by incorporating into the spindle motor as shown in FIG. 13.

The spindle motor shown in FIG. 13 is of outer rotor type in which a pair of upper and lower ball bearings are interposed between the outer peripheral surface of the spindle shaft 6 secured on the base 5 to extend vertically therefrom and the inner peripheral surface of the vertical bore 8 of the rotor hub 7 so as to support the rotor hub 7 rotatably.

In other words, the motor of the type as shown in FIG. 13, the inner race of each ball bearings 9 is stational, and the outer race is rotatable.

In FIG. 13, the reference numeral 10 is added to the rotor magnets provided on the inner surface of the downwardly depending flange of the rotor hub 7, and the reference numeral 11 is added to the stator positioned opposite to the magnets. The rotor hub 7 is adapted to be rotated by providing the electric power to the coils wound around the stator 11. In the case of hard disk drive device, magnetic disk or disks (not shown) are mounted on the outer peripheral surface of the rotor hub 7.

Figure 14:
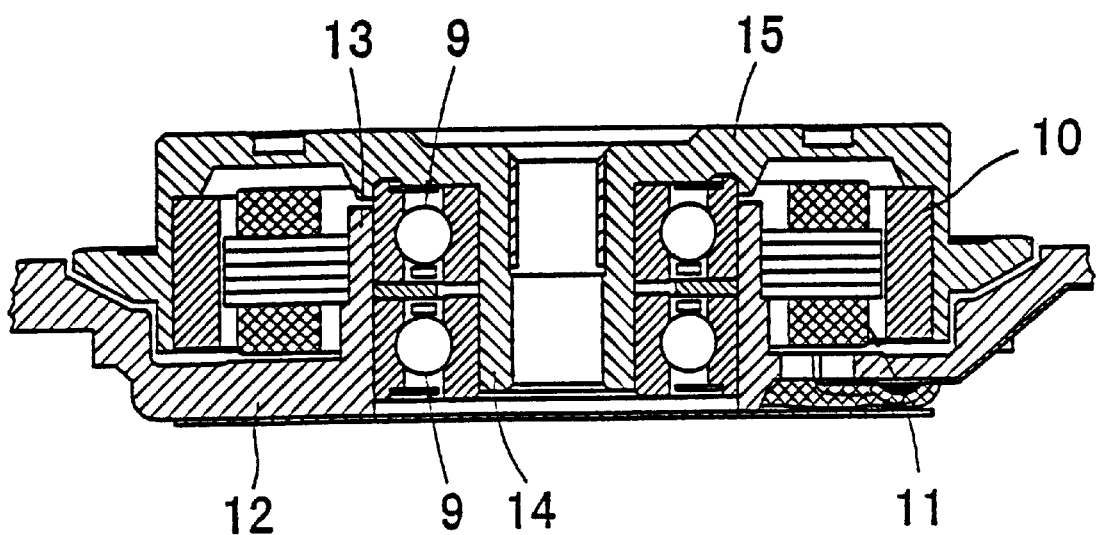
FIG. 14 is a vertical cross sectional view showing another example of the motor in accordance with the present invention.

The spindle motor shown in FIG. 14 is an example of the spindle motor of the inner rotor type in which the spindle shaft 14 is supported through a pair of ball bearings 9 fitted within the sleeve 13 extending vertically from the base 12. The spindle shaft 14 is formed integrally with the rotor hub 15.

In other words, the motor of the type as shown in FIG. 14, the outer race of each ball bearings 9 is stational whereas the inner race is rotatable.

Figure 15:
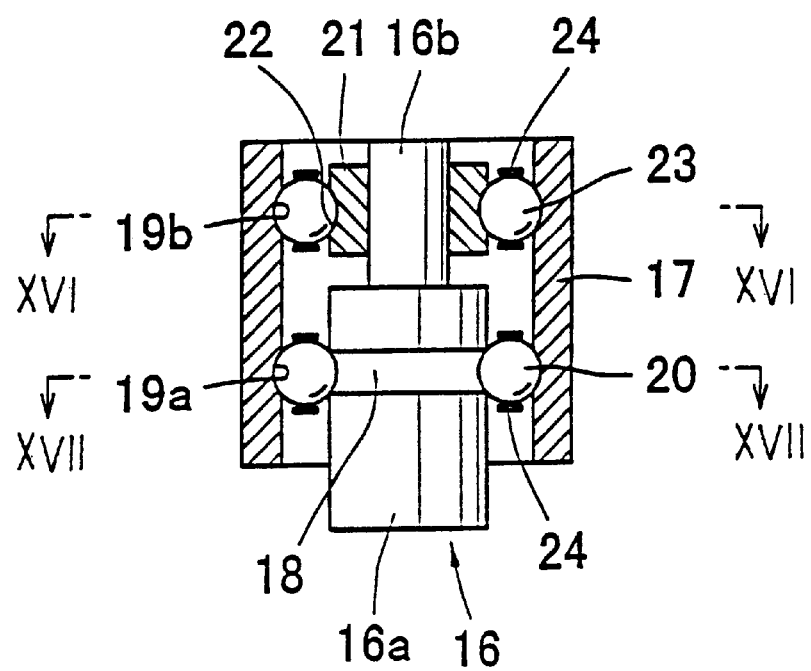
FIG. 15 is a vertical cross sectional view showing another example of the anti-frictional bearing to which the present invention will be applied.
Figure 16:
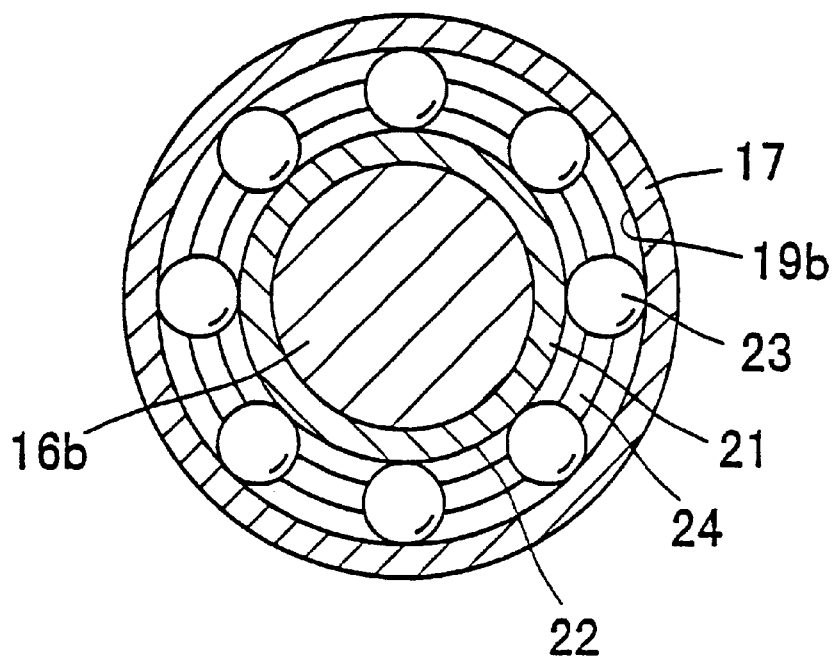
FIG. 16 is a cross sectional view along the line of XVI—XVI in FIG. 15.
Figure 17:
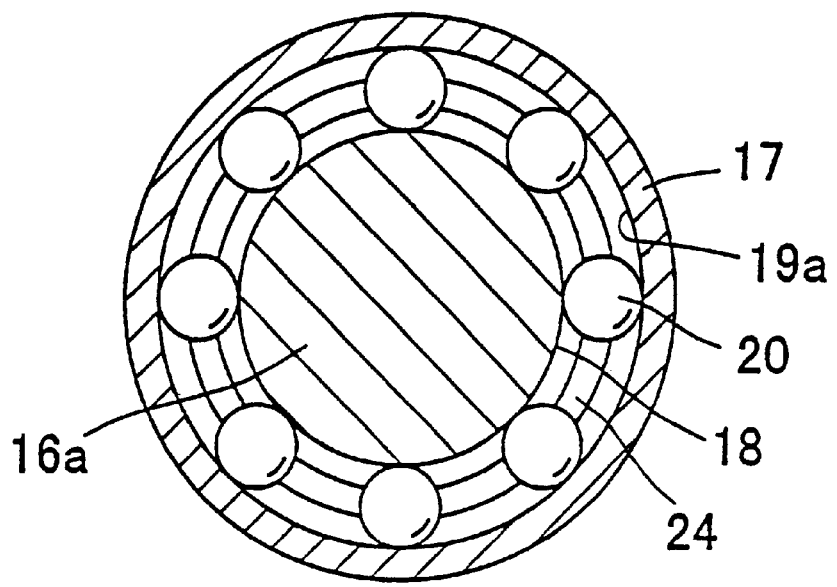
FIG. 17 is a cross sectional view along the line of XVII—XVII in FIG. 15.

In the above-mentioned embodiment, although a ball bearing of generic type in which balls as rotational bodies are interposed between the inner and outer races, the anti-frictional bearing of different type such as the compound bearing including two rows of balls as illustrated in FIGS. 15, 16, and 17 can also be employed.

The anti-frictional bearing shown in FIGS. 15, 16, and 17, spindle shaft 16 is a stepped shaft including an enlarged diameter shaft portion 16a and a reduced diameter shaft portion 16b, an outer race is formed by cylindrical sleeve 17, balls 20 as lower rotating bodies are interposed between the inner race way 18 formed around the outer peripheral surface of the enlarged diameter shaft portion 16a and the first outer race way 19a formed on the inner peripheral surface of the cylindical sleeve 17, balls 23 as upper rotating bodies are interposed between the inner race way 22 formed on inner race 21 fitted around the reduced diameter shaft portion 16b and the second outer race way 19b formed on the inner peripheral surface of the culindrical sleeve 17, and the balls 23, 20, of the upper and lower rows are retaind equidistantly around the shaft with each other by means of retainer 24.

In the anti-frictional bearing having a structure as mentioned above, the enlarged diameter shaft portion 16a included in the spindle shaft will enhance the rigidity of the shaft, so that the durability and anti-vibration property of the shaft is excellent. Further, the inner race of the lower bearing and outer races of upper and lower bearing are unnecessary so that an advantage that the number of the parts can be reduced will surely be obtained.

Figure 18:
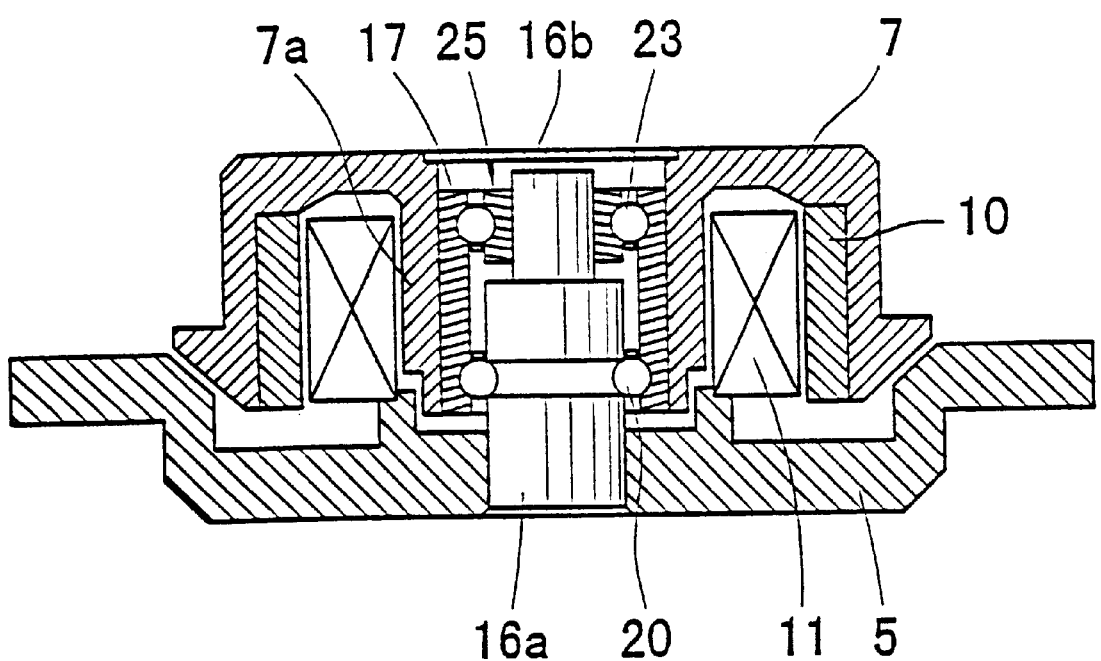
FIG. 18 is a vertical cross sectional view showing the spindle motor including the anti-frictional bearing as shown in FIG. 15.
Figure 19:
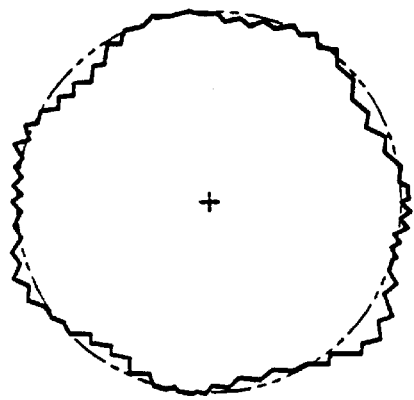
FIGS. 19(a)–19(d) are schematic diagrams for explaining the principle of the harmonic analysis.
Figure 19:
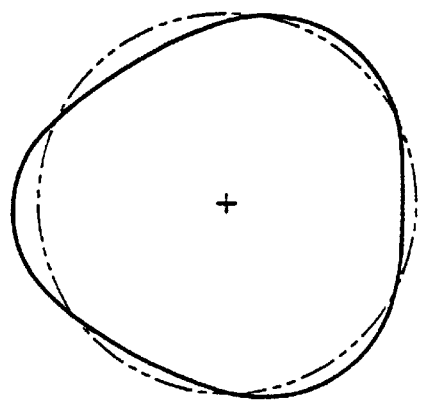
Figure 19:
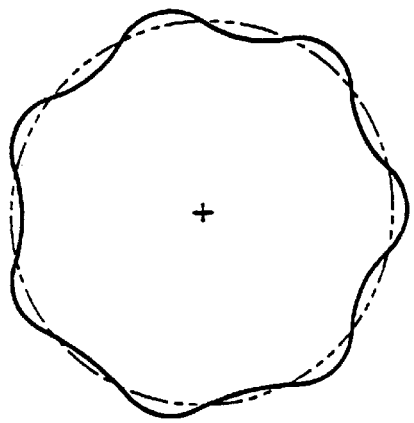
Figure 19:
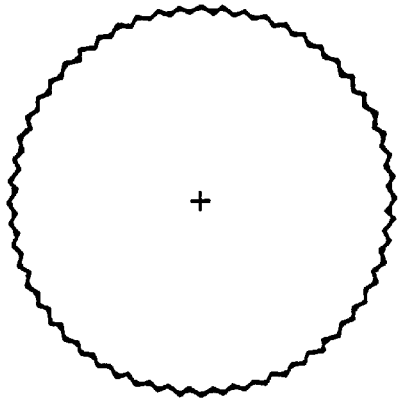
Figure 20:
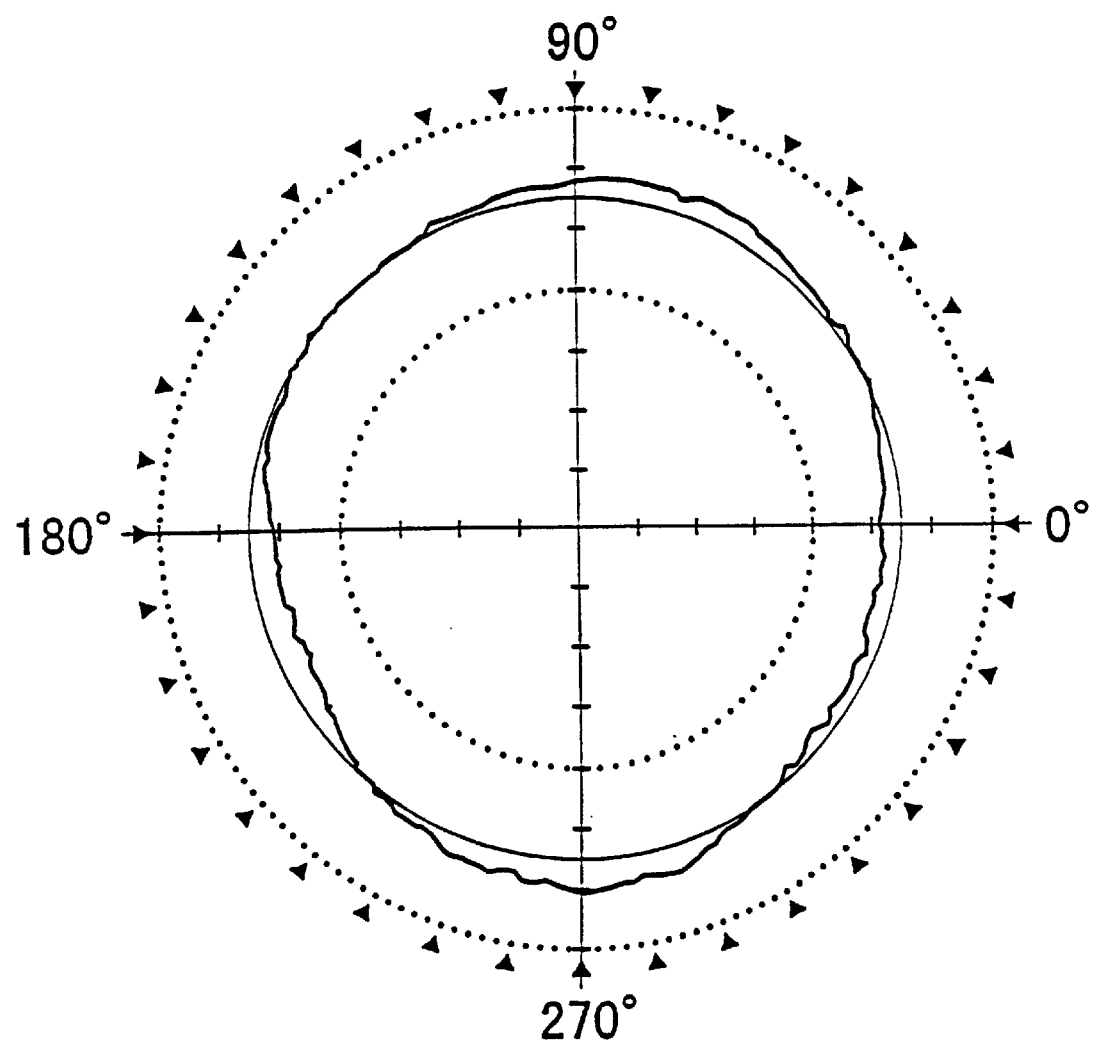
FIG. 20 is a schematic diagram of the shape of the undulation of the inner raceway of the anti-frictional bearing in accordance with the prior art.
Figure 21:
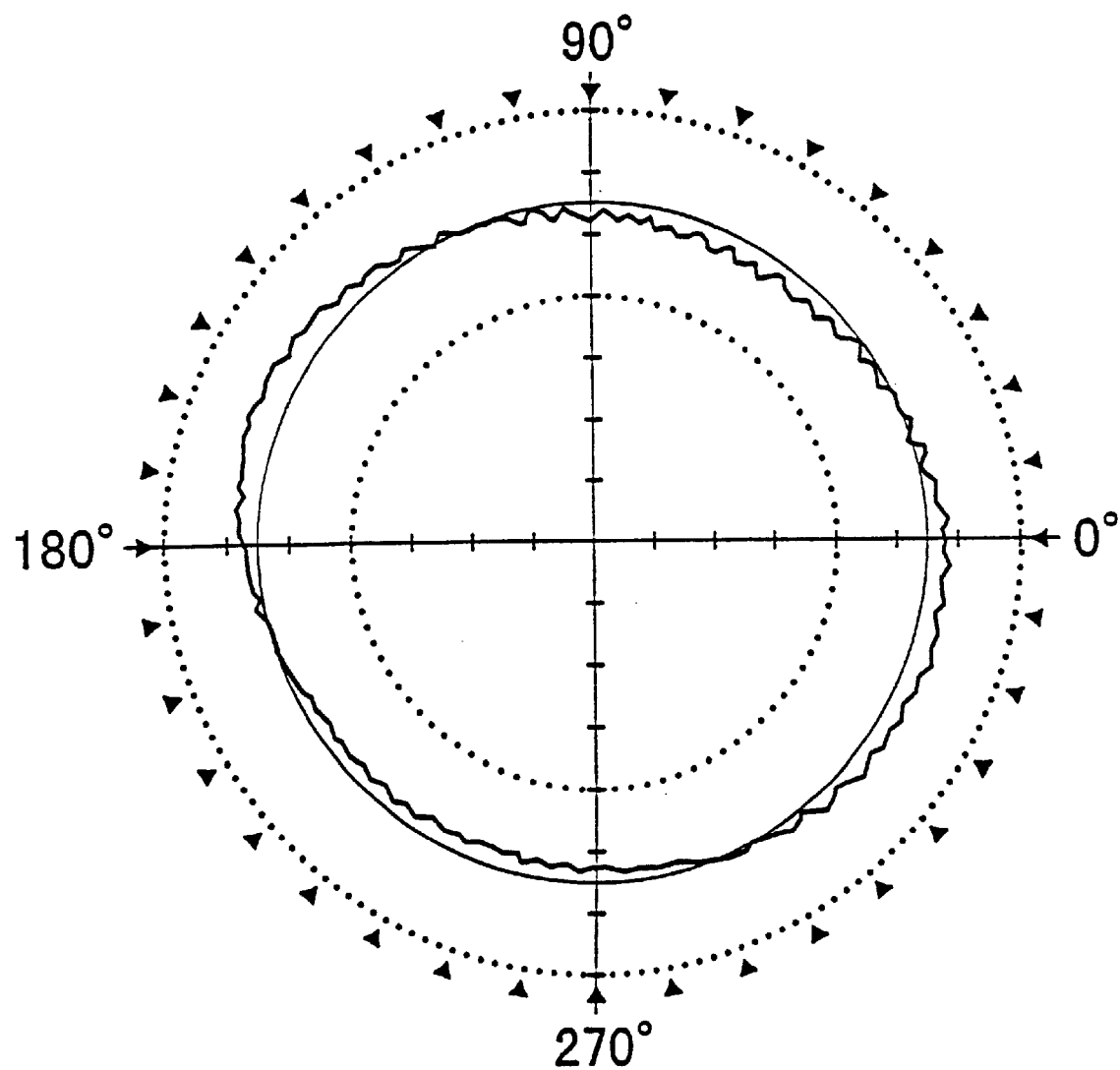
FIG. 21 is a schematic diagram of the shape of the undulation of the inner raceway of the anti-frictional bearing in accordance with the prior art.
Figure 22:
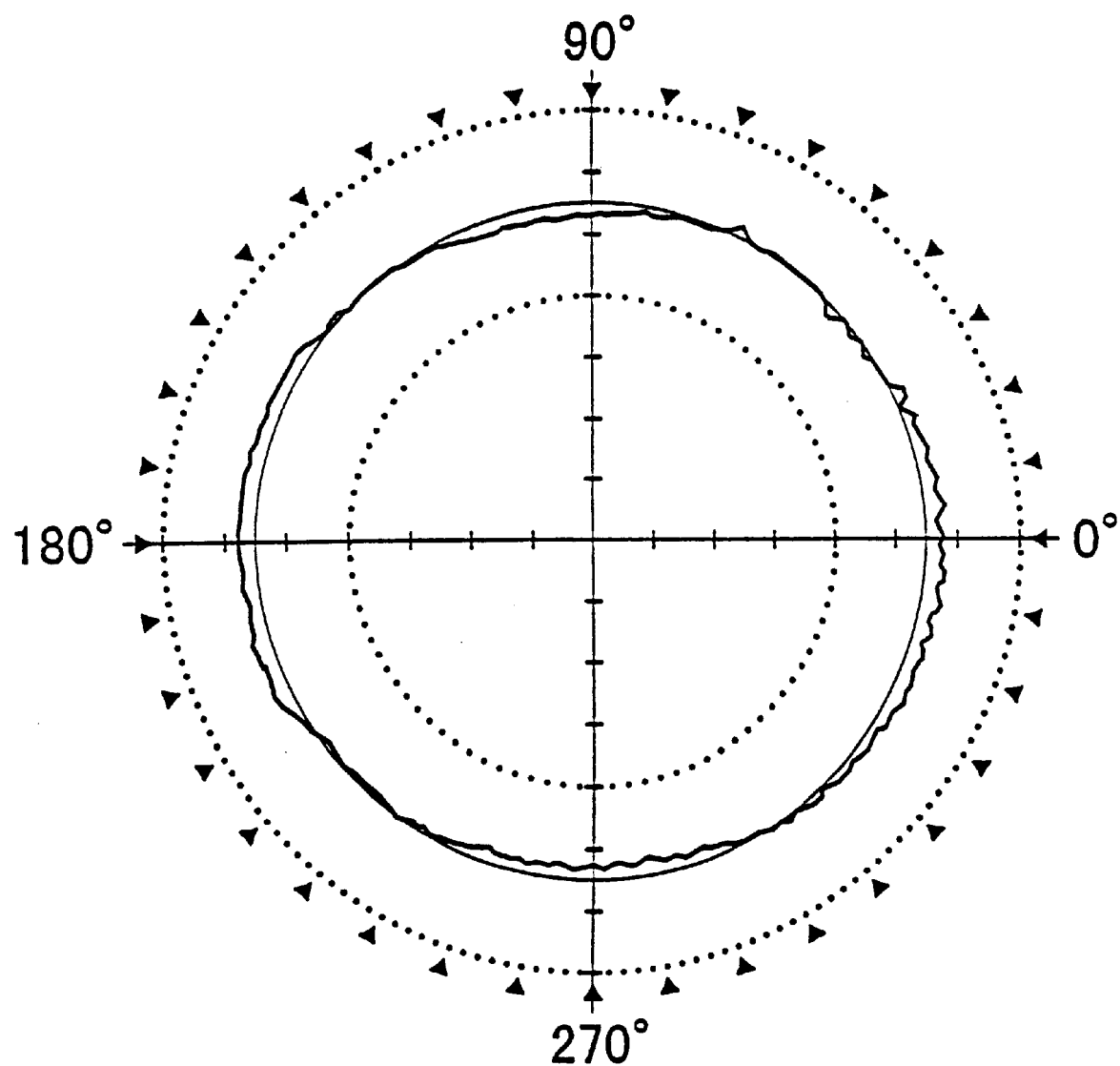
FIG. 22 is a schematic diagram of the shape of the undulation of the inner raceway of the outer anti-frictional bearing in accordance with the prior art.
Figure 23:
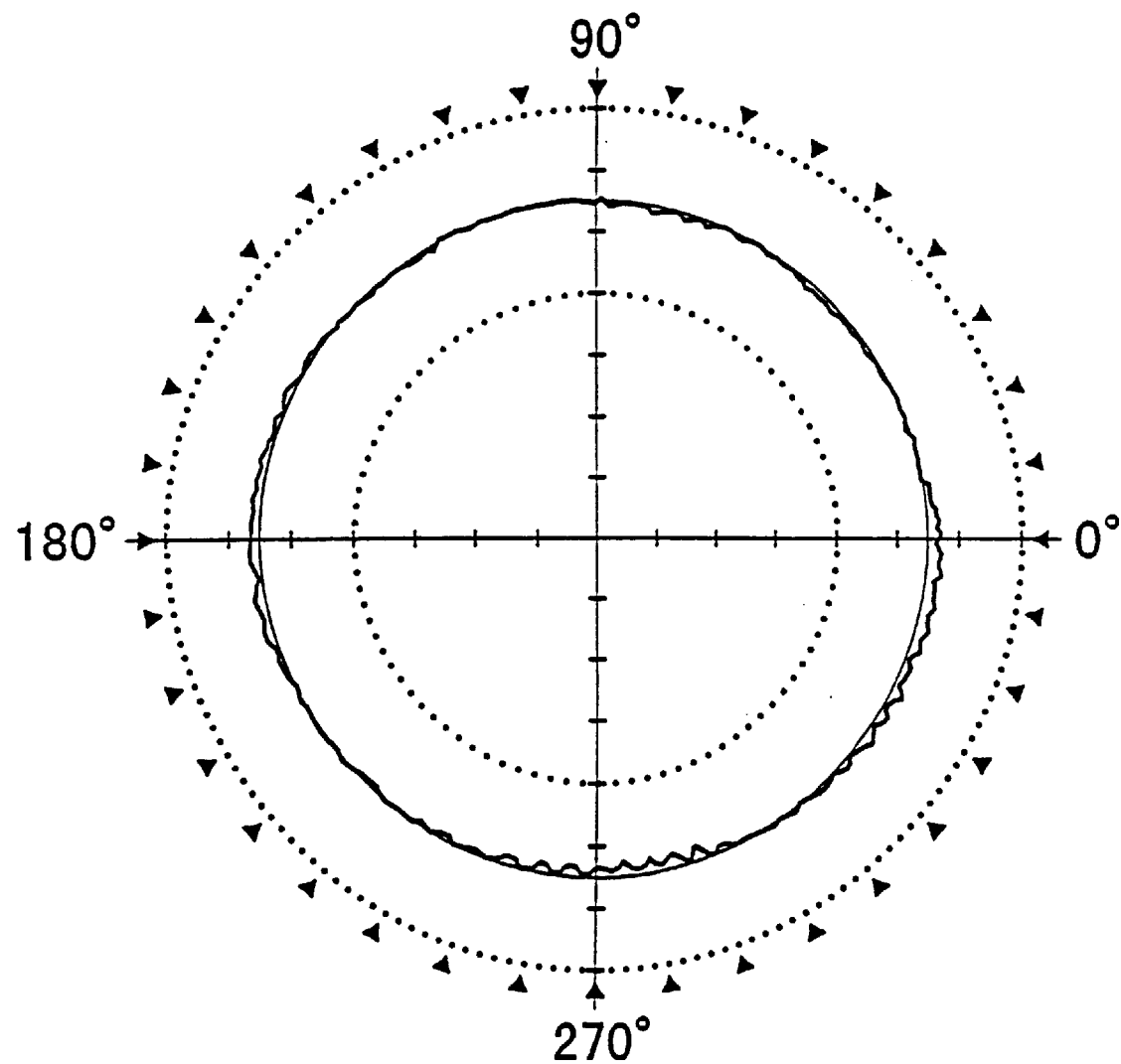
FIG. 23 is a schematic diagram of the shape of the undulation of the inner raceway of the further anti-frictional bearing in accordance with the prior art.

An example of the motor including the anti-frictional bearing of the structure as mentioned above is shown in FIG. 18. In such motor, anti-frictional bearing 25 is mounted within the central cylindrical portion 7a of the rotor hub 7, the rotor hub 7 is journalled rotatably around the spindle shaft 16, the shaft 16 and inner race 21 are stational, and the cylindrical sleeve 17 is rotatable.

The Advantages or Effects to be Derived from the Present Invention

In accordance with the present invention, the unilateral amplitude can be reduced by making the out of roundness of the raceway surface equal to or less than 0.05 μm. In this connection, the cumbersomeness inherent in the prior art that the number of crest and the value of unilateral amplitude of inner and outer races are to be analyzed and selection of the races is to be made to the number of rotating bodies can be eliminated, the production cost for the bearing can be reduced, and the asynchronous rotational run out of the bearing can be improved.

The reduction of the asynchronous rotational run out will also reduce the frictional torque produced within the bearing. This also leads to the reduction of the electric power consumed on the spindle motor of the present invention.

In the hard disk device including the motor of the present invention as a rotational drive means for magnetic disk or disks, high packaging density of the magnetic disk or disks, or enlarged capacity and fast speed of the hard disk drive device can be realized.

Making the packaging density of the magnetic disk or disks higher, the number of magnetic disks to be included within the hard disk device can be reduced, the diameter of each magnetic disk can be reduced, the size of the hard disk device itself can be reduced, and the amount of materials used in the magnetic disk or the casing of the hard disk device can also be reduced to save resources.

In conclusion, reducing of the electric power required in the spindle motor and saving of the resources used for manufacturing the hard disk device will be able to contribute to solving the problem of the environmental disruption or pollution.

While particular embodiments of the present invention have been illustrated and described, it should be obvious to those skilled in the art that various changes and modifications can be made without departing from the spirit and scope of the invention.

What is claimed is:

1. A compund anti-frictional bearing comprising:

a stepped shaft including an enlarged diameter shaft portion on an outer peripheral surface thereof on which an inner raceway is directly formed and a reduced diameter shaft portion around which an inner race is fitted;

a cylindrical sleeve surronding the stepped shaft, the cylindrical sleeve having an inner peripheral surface on which a first outer raceway corresponding to the inner raceway is provided around the outer peripheral surface of the enlarged diameter shaft portion, the cylindrical sleeve also having a second outer raceway corresponding to an inner raceway provided around the outer peripheral surface of the inner race, the first outer race and second outer race being formed directly within the cylindrical sleeve;

a first row of rotating bodies retained by retainers being disposed a predetermined distance from each other, the first row of rotating bodies being disposed between the inner raceway provided around the outer peripheral surface of the enlarged diameter shaft portion and the first outer racewaay of said cylindrical sleeve, the inner and outer raceway surfaces having unilateral amplitude waviness per unit along a corresponding circumference; and a second row of rotating bodies retained by retainers being disposed a predetermined distance from each other, the second row of rotating bodies being disposed between the inner raceway provided around the inner race and the second outer raceway of said cylindrical sleeve, the inner and outer raceway surfaces having unilateral amplitude waveiness per unit along a corresponding circumference;

an out of roundness of the raceway surface of at least one of the inner raceway of the enlarged diameter shaft portion, the inner raceway of said inner race, the first outer raceway of the cylindrical sleeve and the second outer raceway of the cylindrical sleeve is equal to or less than 0.05 $\mu$m, and the unilateral amplitude waviness values of the numbers of crests of (aZ) and (aZ±1) on its raceway surface per unit along the corresponding circumference is equal to or less than 0.001 $\mu$m, which reduces a non-repeatable runout such that a harmonic analysis on the raceway surface is not necessary in manufacturing the compound anti-frictional bearing, wherein a is a positive integer and Z is the number of rotating bodies.

* * * * *